United States Patent [19]
Chambers et al.

[11] Patent Number: 5,558,494
[45] Date of Patent: * Sep. 24, 1996

[54] FLOW CONTROL APPARATUS AND METHOD

[76] Inventors: John E. Chambers, P.O. Box 6747, Greenville, S.C. 29606; David C. Brenner, 702 Edwards Rd., Greenville, S.C. 29615

[*] Notice: The portion of the term of this patent subsequent to Feb. 28, 2012, has been disclaimed.

[21] Appl. No.: 385,691

[22] Filed: Feb. 8, 1995

Related U.S. Application Data

[63] Continuation-in-part of Ser. No. 232,342, Apr. 22, 1994, Pat. No. 5,393,327, which is a continuation of Ser. No. 53,718, Apr. 27, 1993, abandoned.

[51] Int. Cl.[6] ........................................ F01D 9/02
[52] U.S. Cl. .................... 415/208.1; 415/173.1
[58] Field of Search ..................... 415/173.1, 173.2, 415/173.6, 175, 176, 177, 178, 208.1, 211.1, 211.2, 222, 223

[56] References Cited

U.S. PATENT DOCUMENTS

| | | | |
|---|---|---|---|
| 2,169,232 | 8/1939 | Flanders | 415/208.1 |
| 2,265,112 | 12/1941 | Davies | 415/211.2 |
| 2,287,822 | 6/1942 | Odor et al. | 415/208.1 |
| 3,903,960 | 9/1975 | Beck et al. | 415/222 |
| 5,393,327 | 2/1995 | Chambers et al. | 95/273 |

*Primary Examiner*—Edward K. Look
*Assistant Examiner*—Christopher Verdier
*Attorney, Agent, or Firm*—Ralph Bailey

[57] ABSTRACT

A flow control apparatus receives air flow through a closure (A) for discharge through an orifice plate (B) carried at an air exit end opposite an opening in a wall, wherein a bellmouth air entrance member (C) receives air flow from the closure (A) and directs same to an evase (D) for reception thereby through an exit opening in the orifice plate for discharge through the exit opening in the wall.

18 Claims, 5 Drawing Sheets

FLOW CONTROL APPARATUS AND METHOD

This application is a Continuation-in-Part of U.S. Pat. No. 5,393,327, filed Apr. 22, 1994, which is a Continuation of U.S. Ser. No. 08/053,718 filed Apr. 27, 1993, now abandoned.

BACKGROUND OF THE INVENTION

This invention relates to apparatus and method for reducing the pressure drop across an opening in an imperforate plate or wall.

This invention is especially useful in connection with an air filter and the like such as illustrated in U.S. Pat. No. 4,955,996 having an air filter cartridge utilizing pleated paper having a cylindrical configuration as a filter medium. Such filters have proved to be exceedingly effective in removing dust and the like and in filtering out chromate primer dust such as is removed in the mechanical stripping of commercial and military aircraft. Such filters having circular cross section are supplied by several suppliers including Dustex Corporation of Charlotte, North Carolina. Problems with utilizing such filter cartridges where air enters through the sides of the filter which are preferably elongated or at least arranged to present a large filter surface area involves relatively high pressure drops across the filter. The side entrance of fluid is important in such devices because of their greater capacity over those having an entrance end covered with filter material. It has been found that by utilizing apparatus and method in accordance with the present invention, a pressure drop may be reduced substantially as much as from one-fifth to one-tenth of the total former pressure drop. It has been found that the open end or orifice plate of such filter cartridges, having a circular exit opening represents approximately 90% of the pressure drop of the total assembled filter so enhanced flow through the end plate gives the most potential for improvement and pressure drop reduction.

Cartridge filters or other structures may be constructed in accordance with the invention for use in controlling the flow through an orifice in a wall or other barrier to separate the positive pressure area from the negative pressure area to reduce the pressure drop thereacross.

It is contemplated that bellmouth elements such as are often utilized at the entrance end of fan housings or other air handling devices and ducts are utilized according to the present invention for collecting air delivered through side filter media for passing same to the opening in the orifice plate. Such a device may be used alone in combination or with an evase. An evase may also be used alone in the combination with the cartridge filter at the exit end. An evase of the type contemplated herein is often used at the exit end of fan housings and the housings of other components or ducts for the purpose of reducing the pressure drop at the exit end.

SUMMARY OF THE INVENTION

Accordingly, it is an important object of the present invention to provide a cartridge filter having a pressure drop which has been reduced far beyond that which would have been expected through the addition to the filter cartridge combination of either the bellmouth or evase alone or together in the combination. The bellmouth and evase when used together produce an even greater effect in reducing pressure drop than the sum of the effects attained employing one or the other of the components.

Another important object of the invention is to provide an improved air filter for handling dust and the like such as occurs in the cleaning of airplanes as by stripping with glass beads or in a filter chamber or other environment wherein the use of cartridge filters is desirable. Many other applications include filters for gas turbines and filters for use in automotive painting.

Still another important object of the invention is the provision of a filter cartridge utilizing a bellmouth entrance opening at the inside of the open end of the orifice plate to reduce the pressure drop at the exit end of the filter by a far greater amount than would have been anticipated.

Another important object of the invention is the provision of a cartridge filter having an orifice exit plate and an opening provided with an evase.

Yet another important object of the invention is the provision of an apparatus and method utilizing an orifice plate at the exit opening in a wall including the combination of bellmouth entrance components discharging air to an entrance end of a evase adjacent the orifice plate for greatly reducing the pressure drop across the wall.

It has been found, for example, in filter applications where a 120 HP motor has been required to produce the desired air flow that it is possible utilizing the bellmouth and evase in the combination to reduce the size of the motor to 20 HP for the same purpose so great is the reduction in the pressure drop.

While the present invention will be described in terms of an air filter cartridge utilizing a cylindrical configuration of pleated paper, it is to be understood that a filter cartridge suitable for use in any fluid in any liquids having side delivery of air which is expelled through an orifice plate in the exit end may be advantageously utilized in the combination of the invention. The same results could be predicted if these components were used in combinations with apparatus having shapes and configurations other than cartridge filters.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

The drawings illustrate an air filter having an exit end positioned opposite an opening in a wall. A cartridge includes an elongated support structure surrounded by filter media forming a closure A wherein air enters laterally through sides of the filter media. An arcuate orifice plate B is carried at an air exit end of the cartridge having an exit opening for the air therein. A bellmouth air entrance member C is carried within said cartridge having an exit end connected to the cartridge opposite the exit opening of the orifice plate. An evase D has an entrance end connected to the cartridge opposite said exit opening of the orifice plate. The exit end of the bellmouth and the entrance end of the evase are in juxtaposition so that the evase receives air collected by the bellmouth directly from the exit end and discharges same from the cartridge through the evase.

Thus, the air pressure drop across the air filter is minimized. Preferably the cartridge, orifice plate, bellmouth and evase are circular in cross-section, and an end opposite the air exit end is closed or imperforate. The method contemplates passing an air flow into the cartridge and thence through the bellmouth and evase for reducing the pressure drop across the filter.

Figure 1:
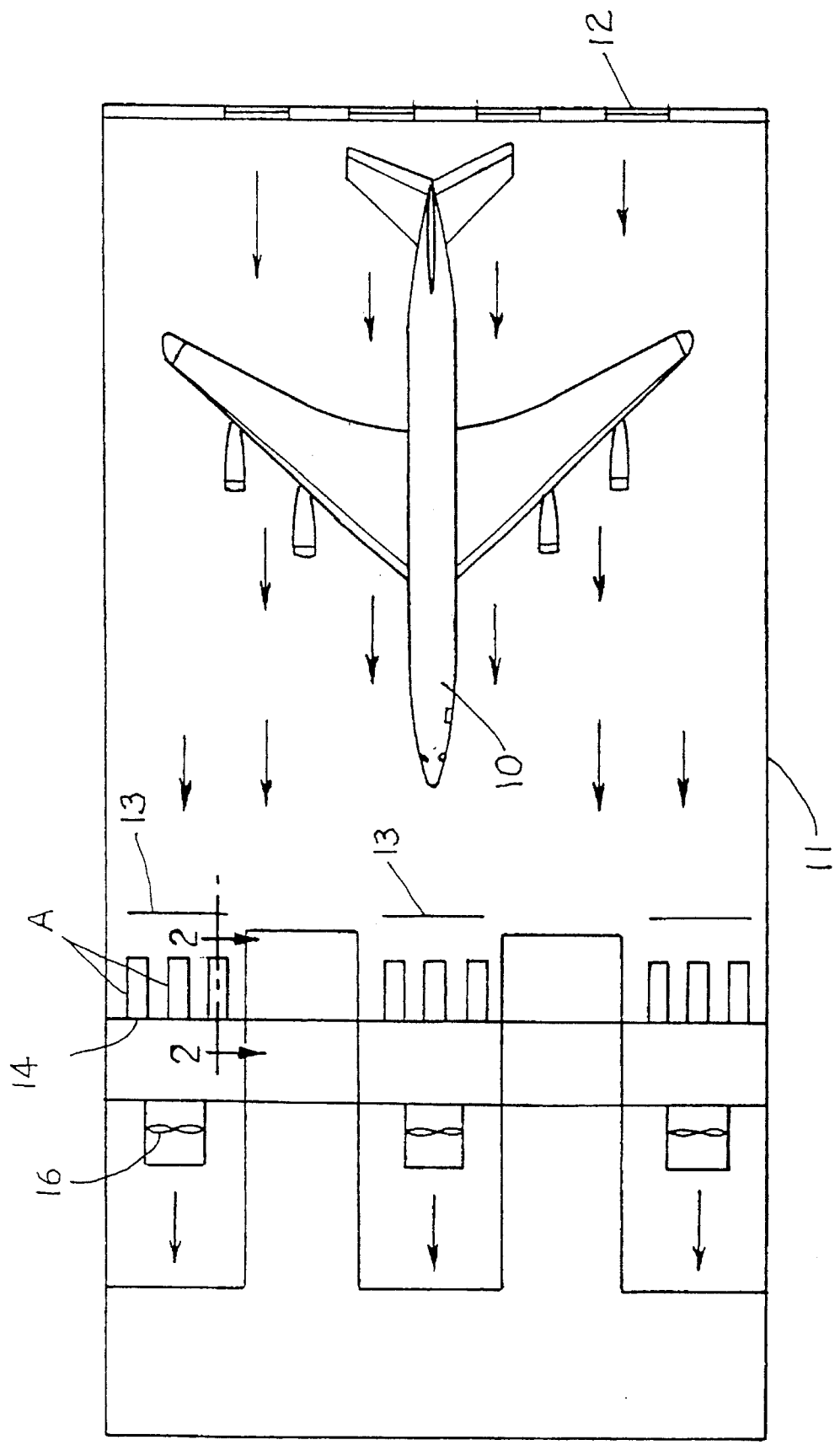
FIG. 1 is a schematic top plan view of a hanger and air handling apparatus for the mechanical stripping of an airplane as by blasting with fine particulate material.

Referring more particularly to FIG. 1, a schematic top plan view illustrates an airplane 10 positioned in a hanger 11 for carrying out a bead blasting operation. The hanger 11 has air entering through the louvers 12 located above the hanger doors, not shown. The air flow passes over the surfaces of the airplane during the stripping operation which releases dust particles which are carcinogenic and which must be removed from the air stream. The air flow containing particulate material, not already picked up at the point of origin as the spraying takes place during stripping, travels toward the filter cartridges A. Dust shields are illustrated at 13. The filter cartridges A are illustrated as being contained within a wall 14 and a fan 16 producing a suction across the filter or partition 14 which separates the high pressure areas from the low pressure areas inducing air flow through the filter for suitable discharge from the hangers.

Figure 2:
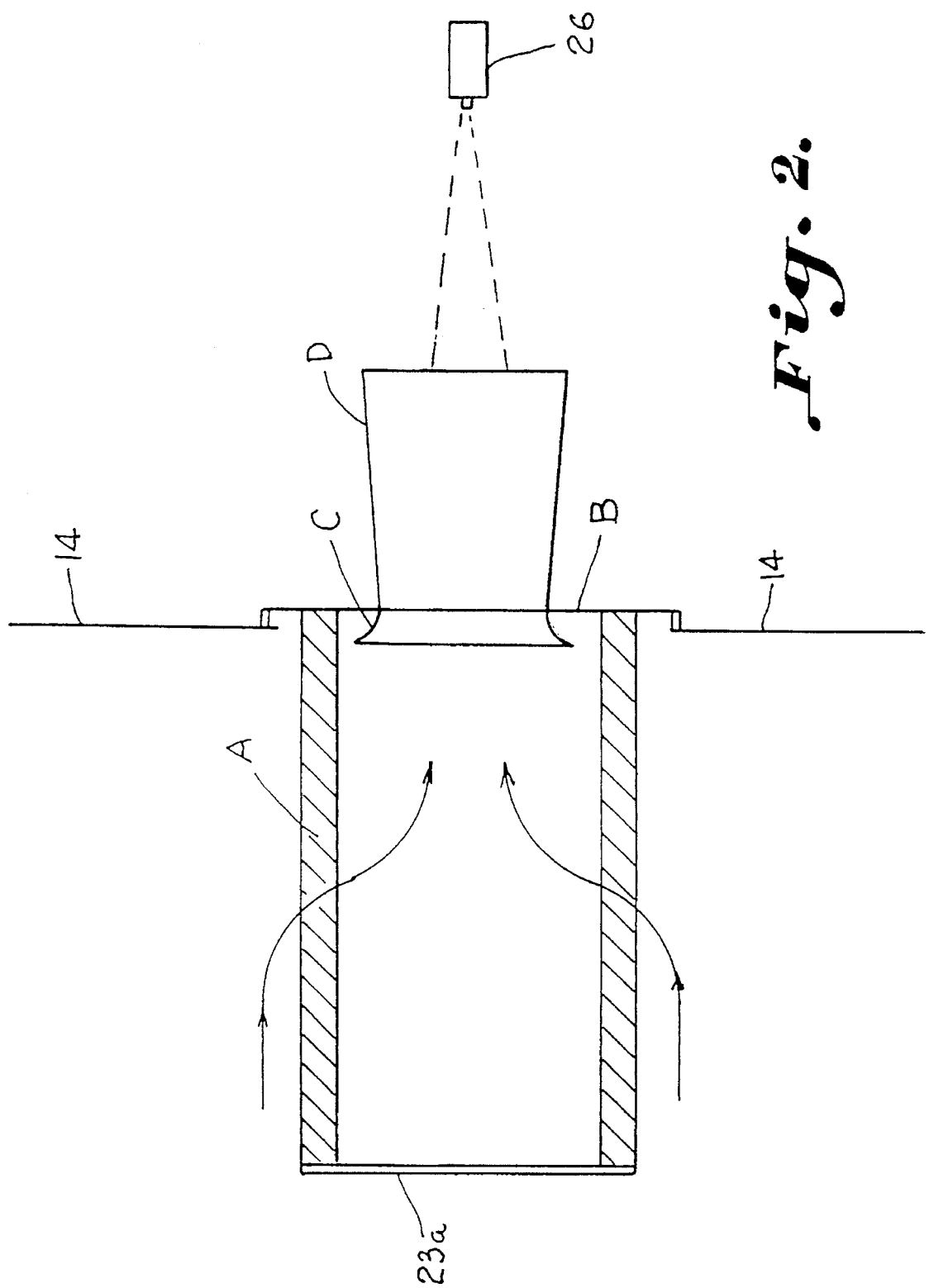
FIG. 2 is a schematic sectional elevation taken on the line 2—2 in FIG. 1.
Figure 3:
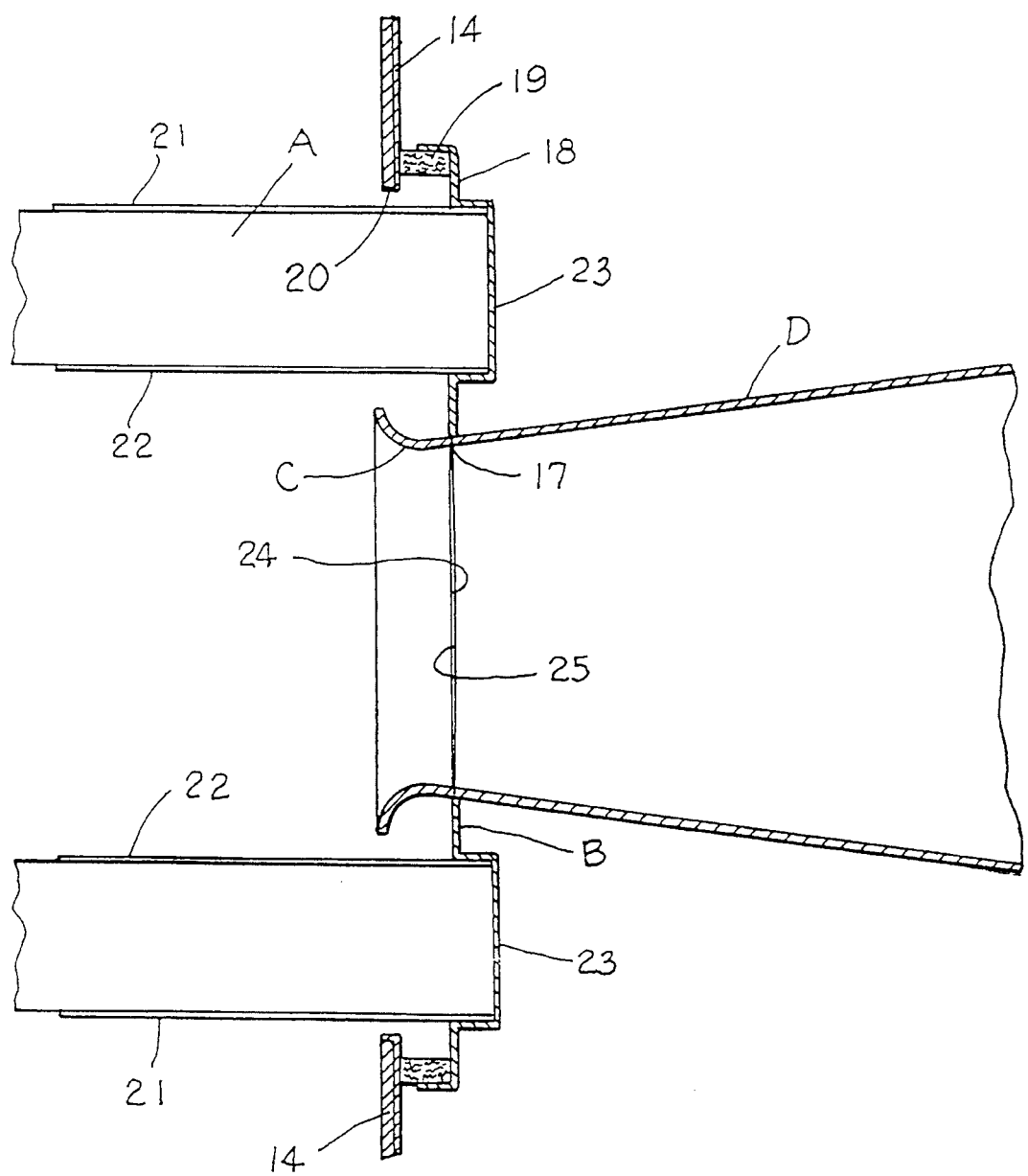
FIG. 3 is an enlarged sectional elevation of the exit end of the filter cartridge illustrated in FIG. 2 showing the mounting of the filter formed by the combination including the filter cartridge, bellmouth and evase.
Figure 4:
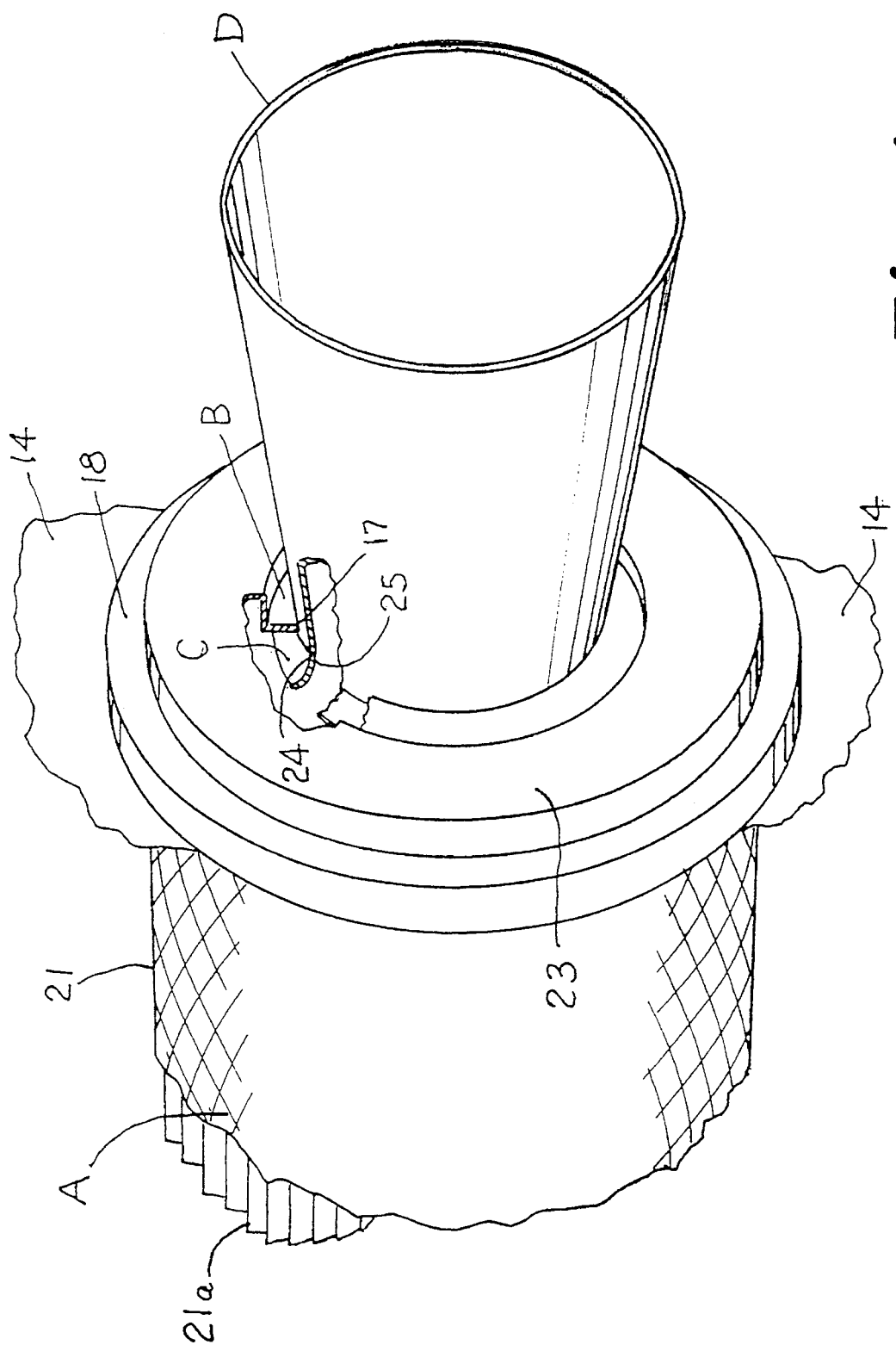
FIG. 4 is a perspective view looking down toward the front left hand side of FIG. 3 showing the cartridge, orifice plate, filter media, bellmouth, exit orifice and evase as being of circular cross section with these elements in axial alignment.

Referring more particularly to FIGS. 2 and 3, it will be observed that the wall 14 has an opening 20 which receives the arcuate filter cartridges A. The orifice plate B is illustrated as being circular, has a circular opening 17 and is integrally connected to a flange 18 which carries a sealing gasket 19 for positioning the orifice plate B in sealing relation within the opening 20 in the filter wall 14. The arcuate filter media 21a is preferably in the form of longitudinally pleated filter paper and is carried in arcuate relation within concentric cylinders or shells constructed as of expanded metal as at 21 and 22 respectively as illustrated in FIG. 3. A circumferential groove is provided as at 23 for receiving the adjacent end of the cartridge filter A. An imperforate end plate opposite the exit end of the filter is illustrated in FIG. 3 at 23a. FIG. 4 illustrates the parts as being preferably circular in cross section and in axial alignment.

Referring again more particularly to FIGS. 2 and 3, it will be observed that air is delivered through the sides of the cartridge filter A into the hollow core of the filter from whence the air flow is straightened through the use of the arcuate bellmouth C. It will be observed that an exit of the bellmouth illustrated at 24 is connected adjacent or directly to the entrance end of the arcuate evase D so as to discharge air therein as illustrated at 25. These exit members and entrance members respectively as well as an edge of the orifice plate B defining the exit opening 17 may be welded at their juncture so as to be joined together in sealed relationship. It is significant that no substantial length of ductwork or other components extends between the exit end of the bellmouth and the entrance end of the evase as might result in substantial turbulence which would result in increased pressure drop. It is significant that the evase be longer than the bellmouth. The mounting of FIG. 3 wherein orifice plate B is on the discharge side of the partition could be reversed to locate the orifice plate on the inlet side of the partition.

As illustrated in FIG. 2, a blow down nozzle illustrated at 26 may be utilized to blow back air through the exit cartridge for the purpose of cleaning.

Large air intake systems require a filter to remove particulate matter from the air upon intake or before discharge. The filter must be effective, economical, replaceable or cleanable and offer as low a pressure drop as possible. With large air volumes the fan horsepower presents a major operating cost so low pressure drop filters offer significant cost savings.

Cartridge filters are widely used for this purpose, however, most of these have higher pressure drops than desired resulting in high fan operating cost. Cartridge filters utilize a cylindrical filter media with one imperforate end cap and one open end cap or plate at an exit end. When a negative pressure is applied to the open end plate, air is pulled from the exterior and through the cylindrical filter element, and thence from the interior of the filter through the open end plate at the exit end.

Since the open end plate acts as an orifice, a significant pressure drop occurs as air passes through the open end plate. The majority of the cartridge filter pressure drop occurs in the orifice formed in the open end plate.

It has been found that major reductions in total filter pressure drop can be attained by improving the air flow characteristics of the open end plate. Substantial improvement has been obtained by adding a bellmouth shaped inlet at the end plate utilizing the bell shape inside the filter to direct air and to reduce pressure drop through the open end plate. Additional improvement is achieved by joining an evase to the discharge side of the open end plate to allow a controlled expansion of the air directed thereto by the bellmouth as a result of the increasing cross-sectional area of the evase.

By combining either or both of these elements with the open end plate will greatly reduce the filter pressure drop. The close coupling of these elements has not been used in filter manufacturing before. It may be significant that the parts are joined in close proximity, touching one another, with the bellmouth inlet, the open end plate and the evase. Each of these elements have tapering cross sections, the bellmouth being arcuate and the evase having straight conical sides.

The combination of the bellmouth communicating directly to the evase is more effective than the combining of these components utilizing either a space or sleeve therebetween. By direct coupling turbulence and pressure drop that a space would cause are eliminated. With a space, air would tend to expand between the bellmouth and the evase.

Even with a sleeve connection such indirect combination will result in frictional loss due to the sleeve length.

The bellmouth would be effective for air entering the filter either through sides or end. The filter surface area is much larger utilizing side entry, and for this reason side entry is preferred.

From the following test results, it may be concluded that the utilization of a bellmouth alone substantially reduces the pressure drop across the filter to a far greater extent than would have occurred in fans or other ductwork where the bellmouth would be used conventionly at an entrance end. In such structures utilizing a bellmouth alone approximately a twelve (12%) percent reduction in pressure drop may be expected

TEST RESULTS

Compare Pressure Drop of Open End Plate 8.875" I.D.

Original Plate vs. Plate with Full Bellmouth vs. Plate with Bellmouth and Discharge Cone.

| Ctr. Line Vel. FPM | Avg. Vel. FPM | Flow Area Sq. Ft. | Flow CFM CFL | Orig. Pres. Drop in H2° | Bellmouth Pres. Drop in H2° | Bellmouth & Cone Pres. Drop in H2° |
|---|---|---|---|---|---|---|
| 1700 | 1530 | .79 | 1202 | 1.32 | .61 | .14 |
| 1950 | 1755 | .79 | 1378 | 1.70 | .80 | .19 |
| 2150 | 1935 | .79 | 1520 | 1.94 | .95 | .32 |
| 2400 | 2160 | .79 | 1696 | 2.50 | 1.19 | .38 |
| 2620 | 2358 | .79 | 1852 | 3.07 | 1.37 | .49 |

An additional test utilizing an evase only produced the following results.

Open End Plate—8.875" I.D. with Evase Only.

| Ctr. Line Vel. FPM | Avg. Vel. FPM | Flow Area Sq. Ft. | Flow CFM CFM | Inlet Pres. in H2° | Outlet Pres. in H2° | Evase Pres. Drop in H2° |
|---|---|---|---|---|---|---|
| 1700 | 1530 | .79 | 1202 | 1.56 | 2.35 | .79 |
| 1950 | 1755 | .79 | 1378 | 2.10 | 3.19 | 1.09 |
| 2150 | 1935 | .79 | 1520 | 1.43 | 2.71 | 1.28 |
| 2400 | 2160 | .79 | 1696 | 1.86 | 3.44 | 1.58 |
| 2620 | 2358 | .79 | 1852 | 1.67 | 3.87 | 2.20 |

The tests illustrate the fact that even utilizing an evase alone, a greater than expected reduction in pressure drops occur across the filter than would be expected, utilizing the evase alone where even less than 12% improvement would be expected. This is possibly because a fan and the like presents a barrel like member for air flow in contrast to a plate with central round orifice which presents a much more difficult passage for air flow.

These test results taken with the test results first above given, indicate that reductions in individual pressure drops resulted from the combination bellmouth and evase resulting in a reduction in pressure drop greater than would be expected and greater than that attributable to the sum of the two elements. It has been found that the filter media of filters constructed in accordance with the invention has greater capabilities in particle retention during the filtering operation. This is believed to be due to more even air flow across sides of the filter resulting from reduced turbulence and more even distribution of the dust collected.

The reduction in pressure drop described above allows the user to reduce cost on the initial purchase of fans and motors with smaller equipment being suitable and on a continuing basis with lower operating cost.

For further example of savings in other systems, in the gas turbine industry every unit of pressure drop reduction could be worth millions per year in lower operating cost and higher turbine operating efficiencies.

By using air to control the temperature and thermal expansion of the outer turbine housing, it is possible to optimize the gap between the turbine housing and the rotating elements. This results in improved efficiency for turbine operation where fractions of a percent are worth large savings to the power station operator.

Figure 5:
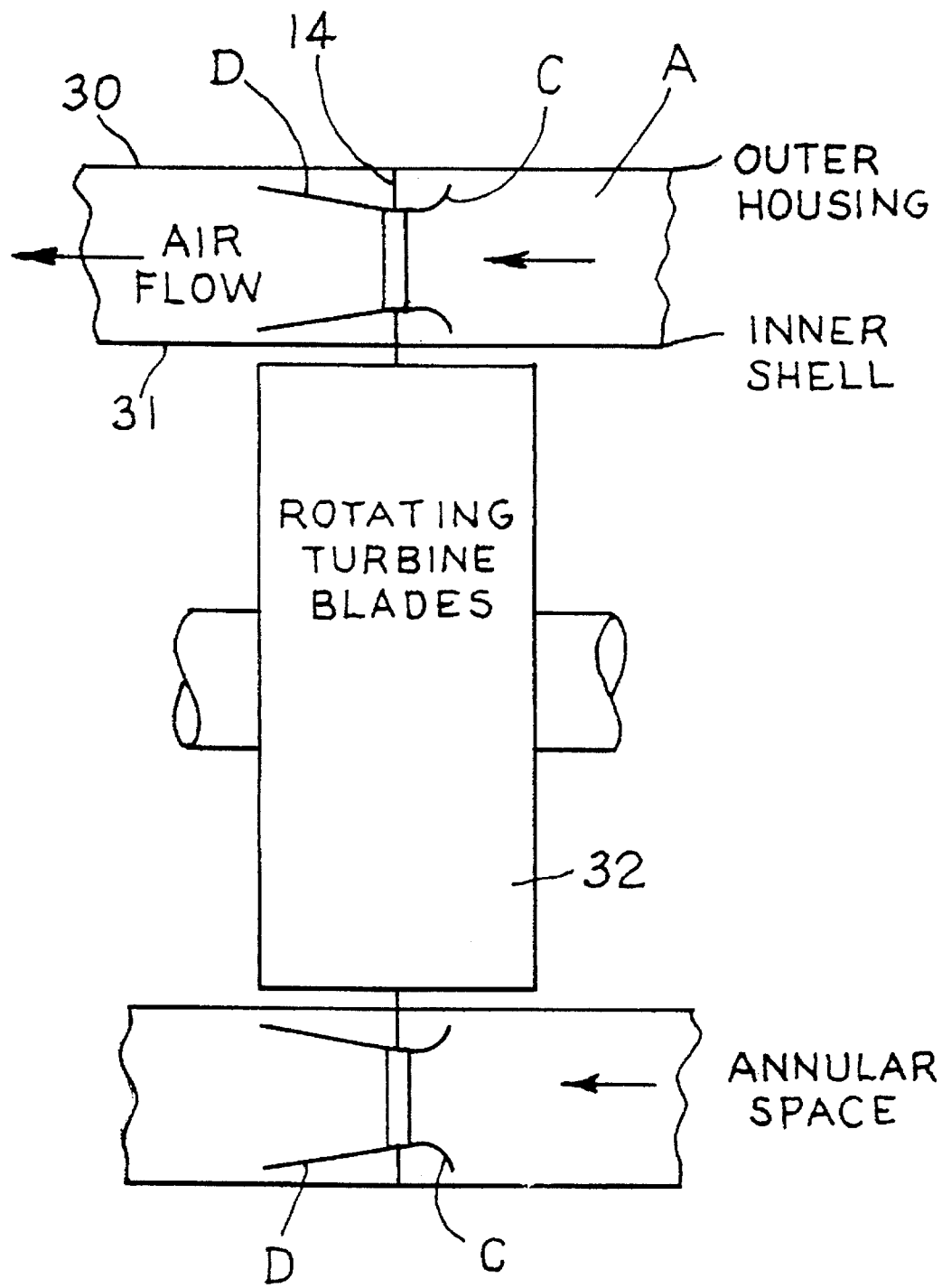
FIG. 5 is a schematic side elevation illustrating a modified form of the invention.

As illustrated in FIG. 5, air is forced in the closure A formed between the outer housing 30 and inner shell 31 through an arcuate orifice plate or ring B. All air flows through the orifice plates B since they provide the only open flow area through the imperforate plate 14. The turbine blades are illustrated at 32. At 1930 CFM per 10" diameter plate opening, the plate pressure drop across the wall in laboratory test is 1.79" water. By adding a bellmouth C only the pressure drop was reduced to 0.69" water. By adding an evase D only the pressure drop was reduced to 0.88" water.

By adding both bellmouth and evase the pressure drop was reduced to 0.20" water.

While a preferred embodiment of the invention has been described using specific terms, such description is for illustrative purposes only, and it is to be understood that changes and variations may be made without departing from the spirit or scope of the following claims.

What is claimed is:

1. An air flow control apparatus positioned opposite an opening in a wall comprising:

an orifice plate extending across said exit opening for air in said wall;

a bellmouth air entrance member carried on one side of said orifice plate having walls tapering inwardly to an exit end connected adjacent said exit opening in said orifice plate in alignment therewith;

an evase positioned on the other side of said orifice plate having walls tapering outwardly from an entrance end connected adjacent said orifice plate in alignment with said exit opening and with said exit end of said bellmouth; and said exit end of said bellmouth and said entrance end of said evase being aligned and in juxtaposition on respective opposite sides of said orifice plate providing an open and unrestricted passageway for substantially unrestricted and undisturbed air flow so that said evase receives air collected by said bellmouth directly from the exit end and discharges same through said erase;

whereby an air pressure drop across said exit opening is minimized.

2. The structure set forth in claim 1 wherein said exit openings in said orifice plate, bellmouth and evase are circular in cross-section.

3. The structure set forth in claim 2 wherein said bellmouth is fastened to said evase.

4. The structure set forth in claim 3 wherein said bellmouth and said evase are fixed to said orifice plate in axial alignment therewith.

5. The structure set forth in claim 1 including a closure through which air enters said orifice plate.

6. The structure set forth in claim 5 wherein said closure is formed by an outer housing and an inner shell containing rotating turbine blades.

7. The structure set forth in claim 1 wherein said bellmouth has an arcuate surface which is circular in cross-section and said evase has a straight conical surface.

8. The structure set forth in claim 7 wherein said evase is longer than said bellmouth.

9. The structure set forth in claim 5 wherein said closure includes spaced concentric shells open to air flow therethrough.

10. The method of controlling air flow in an elongated closure having an orifice plate carried at an air exit end of said closure comprising the steps of:

introducing air flow into said closure;

passing said air flow into an open end of a bellmouth having inward tapering walls on one side of the orifice plate and an exit end carried adjacent said orifice plate; and then introducing said air flow through said orifice plate directly into an entrance end of an erase having outward tapering walls carried exteriorally of the elongated cartridge so that an open and unrestricted passageway is provided for substantially unrestricted and undisturbed air flow;

whereby a pressure drop across the closure is reduced.

11. The method set forth in claim 10 including the step of:

utilizing an outer housing and an inner shell forming spaced cylindrical supports.

12. A fluid flow control apparatus having an exit end positioned opposite an opening in a wall comprising:

an orifice plate extending across said exit opening in said wall for fluid;

a bellmouth fluid entrance member carried adjacent and in alignment with an exit opening in said orifice plate; and said exit end of said bellmouth and said exit opening in said orifice plate being in juxtaposition providing an open and unrestricted passageway through said bellmouth and said exit opening for substantially unrestricted and undisturbed fluid flow so that fluid collected by said bellmouth is discharged through said exit opening;

whereby an air pressure drop across said wall is minimized.

13. The structure set forth in claim 12 wherein said exit opening in said orifice plate and said bellmouth are circular in cross-section.

14. A fluid flow control apparatus having an exit end positioned opposite an opening in a wall comprising:

a cylindrical closure including an elongated support structure forming an entrance for said fluid;

an orifice plate extending across a fluid exit end of said closure having an exit opening for said fluid;

an element of circular cross-section having tapered walls for reducing turbulence having a minimum diameter adjacent said orifice plate connected in aligned relation to said closure adjacent said orifice plate opposite said exit opening for reducing the pressure drop at the exit opening by providing an open and unrestricted passageway for substantially unrestricted and undisturbed fluid flow; and an entrance end of said element and said exit end of a cartridge being in juxtaposition so that said element receives fluid collected in said closure and discharges same from said exit opening;

whereby a fluid pressure drop across said wall is minimized.

15. The structure set forth in claim 14 wherein said closure and said exit opening in said orifice plate are circular in cross-section.

16. The structure set forth in claim 14 wherein said element is a bellmouth fluid entrance member carried within said closure adjacent said orifice plate discharging fluid from the exit end of said closure.

17. The structure set forth in claim 16 including an evase discharging fluid from the exit end of said closure, and wherein said closure, said exit opening in said orifice plate, evase, bellmouth, and closure are arcuate in cross-section and are aligned for reducing pressure drop.

18. The structure set forth in claim 14 wherein said element is an evase carried on the other side of said wall discharging fluid from the exit end of said closure.

* * * * *